May 4, 1937.  L. C. EDGAR ET AL  2,079,111
APPARATUS FOR TREATING MOLTEN MATERIALS
Original Filed Dec. 15, 1931  3 Sheets-Sheet 1

INVENTORS

May 4, 1937. L. C. EDGAR ET AL 2,079,111
APPARATUS FOR TREATING MOLTEN MATERIALS
Original Filed Dec. 15, 1931 3 Sheets-Sheet 3

INVENTORS
Louis C. Edgar,
Edgar C. Crosius,

Patented May 4, 1937

2,079,111

UNITED STATES PATENT OFFICE 2,079,111

APPARATUS FOR TREATING MOLTEN MATERIALS

Louis C. Edgar, Swissvale, and Edgar E. Brosius, Pittsburgh, Pa.; said Edgar assignor to said Brosius Application December 15, 1931, Serial No. 581,100
Renewed August 5, 1935

2 Claims. (Cl. 83—91)

The present invention relates broadly to the art of substance preparation and material treatment, and more particularly to this art as applicable to the treatment of molten materials, such as slag, for the purpose of effecting a separation of the relatively heavier and more valuable constituents from the relatively lighter constituents.

The invention while applicable broadly to the treatment of any slag containing constituents of relatively heavier characteristics, is particularly adaptable to the treatment of slags such as formed in either a blast furnace or an open hearth, and containing either free iron, free steel, or alloys of iron and steel which it is desired to re-claim from the slag. For purposes of a better understanding of the present invention, it will be hereinafter referred to as applicable more especially to blast furnace and open hearth slags, although it will be understood that the utility of the invention in its broader aspects is not thus limited, the invention having utility in the field of smelter operation for the separation of non-ferrous metals.

In the regular operation of blast furnaces at the present time, it is customary practice to re-claim the metallic constituents of the slag by subjecting the same, after having been broken up to a suitable fineness, at a point usually remote from the blast furnace itself, to a magnetic separating action.

In the case of an open hearth, the more valuable metal constituent usually separates from the slag in the ladle into which the slag is tapped or discharged. The solidified mass of slag and metal, usually referred to as a skull, is subjected at a point remote from the open hearth furnace, to a disintegrating or breaking up operation under the influence of a skull cracker. This breaking up operation effects a partial separation of the metallic constituent, which is thereafter carried back and re-melted, and a more or less complete granulation of the slag so as to render it available for charging into the blast furnace.

From the foregoing brief description, it will be apparent that the customary procedure of handling slags involves not only a considerable transportation cost, but also an appreciable handling or treatment cost. The present methods, in addition to the objection as to cost, are further unsatisfactory in that the separation of the metal and slag is only partial, a considerable amount of slag adhering to the metal, and in that the slag itself is not disintegrated to such an extent as to permit easy or expeditious handling thereof.

It is one of the objects of the present invention to provide an improved method and apparatus which, as applicable to the treatment of blast furnace and open hearth slags, is characterized by a separation of the metallic constituents from the slag constituents at a point adjacent the furnace, whereby the expensive transportation charges are eliminated.

A further object of the present invention is to provide a method and apparatus for slag treatment of such nature that the separation of the different constituents is more effectively obtained, together with a more complete granulation of the slag. Specifically, the invention contemplates subjecting the slag in molten condition to the action of a centrifuge effective for consolidating the metallic constituents into a solid body, and for passing the slag into a granulating zone wherein it is subjected to an abrupt change in temperature, as by the addition of water, effective for granulating it to such an extent that it may thereafter be easily handled.

In the accompanying drawings we have shown for purposes of illustration only, and more or less diagrammatically, certain preferred embodiments of the present invention. In the drawings—

Figure 1:
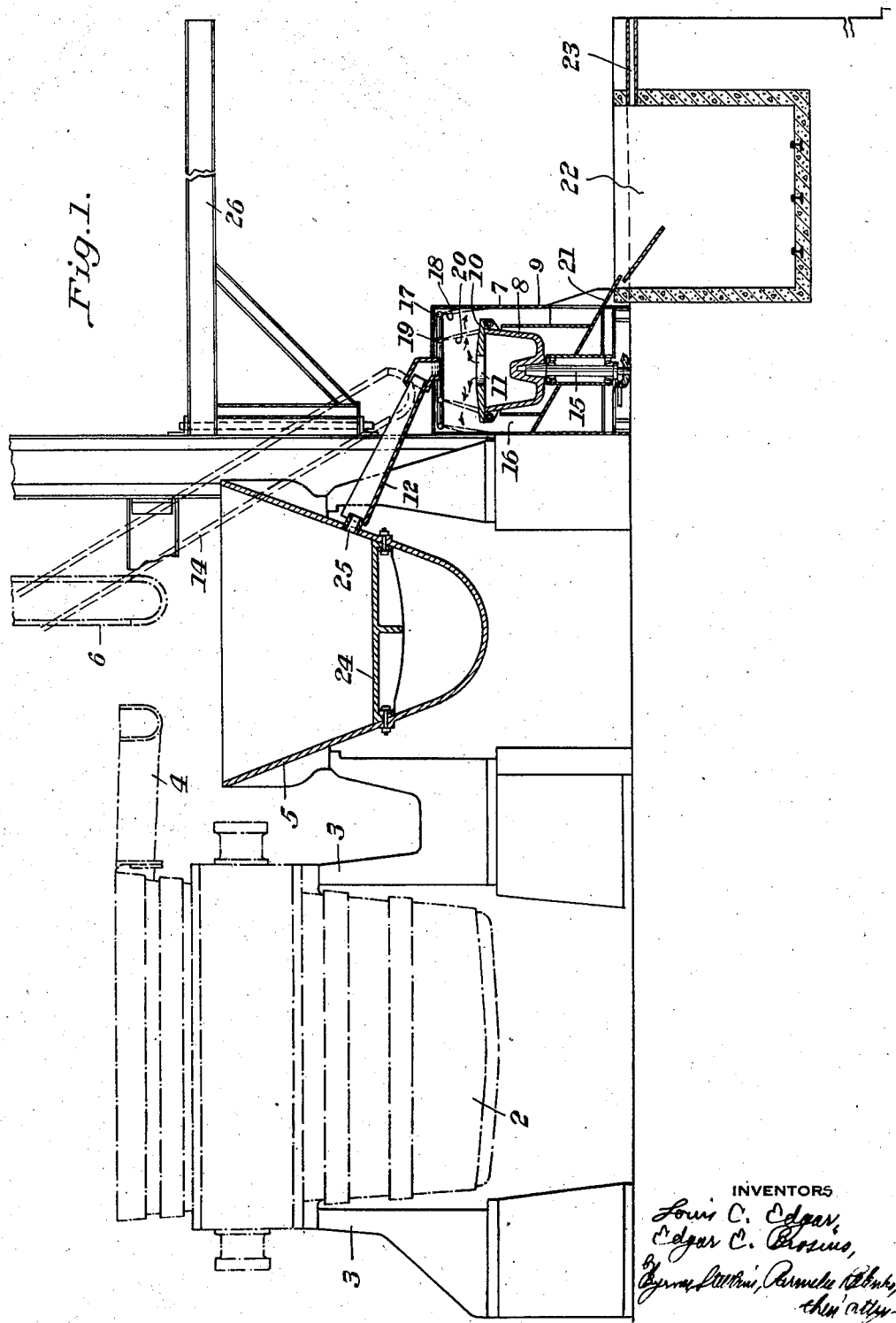
Figure 1 is a diagrammatic view, partly in elevation and partly in section, of one form of apparatus as applicable to the treatment of open hearth slag.

Referring more particularly to Figure 1 of the drawings, we have illustrated more or less diagrammatically one possible layout as applicable to open hearth furnace operation and effective not only for treatment of the slag tapped off from the furnace during the regular melting period, but also for the treatment of the slag which is discharged from the ladle during the metal tapping operation.

In the case of certain heats, as for example, heats in connection with the production of rail steel requiring a low phosphorus content, it is customary at a time when the charge within the furnace is boiling violently, to flush therefrom a portion of the slag content. Due to the agitation caused by the boiling, this slag is characterized by a very appreciable steel content, the proportion of steel being such that it is necessary to effect a recovery thereof. Likewise when the heat is tapped from the furnace at the conclusion of the melting period, the slag discharge from the ladle contains a sufficient steel content to represent a considerable loss in case recovery is not effected. This is more especially true in case the charge within the furnace exceeds, by any amount, the capacity of the ladle, the excess amount in such cases flowing from the ladle into the cinder pot with the slag.

In Figure 1 there is illustrated in outline a ladle 2, of any desired construction, mounted on supports 3 so located that the ladle is adapted to directly receive the heat from the open hearth. Secured to the ladle so as to constitute an overflow, is a trough 4 of such length as to discharge into a cinder pot 5. This cinder pot is mounted in line with a slag runner 6 from the open hearth so that it may receive either the flushing slag discharged through the slag runner, or the slag and excess steel from the ladle 2. This cinder pot is also effective for receiving the drippings from the furnace at the completion of a tapping operation and after removal of the trough.

In accordance with our invention, we provide in a suitable position adjacent the cinder pot, a slag treating apparatus 7 herein illustrated as comprising a centrifuge 8 mounted within a protective casing 9.

Figure 2:
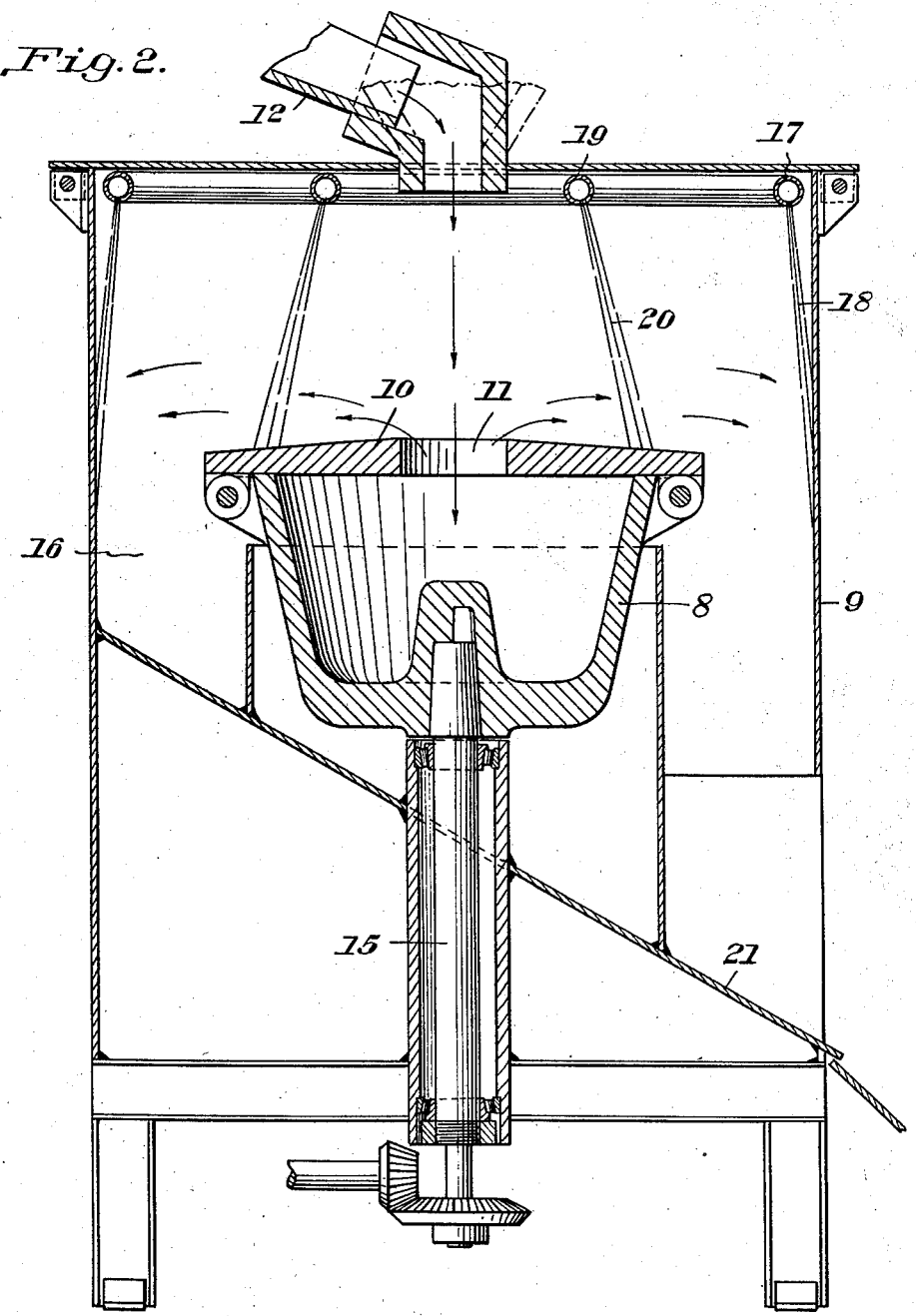
Figure 2 is a detail sectional view through the centrifuge of Figure 1.

As illustrated more particularly in Figure 2 of the drawings, the centrifuge preferably comprises a pot having a cover 10 formed with a central opening 11, which opening is adapted to receive the material to be treated either through a trough or runner 12 leading from the cinder pot, as shown in Figure 1, or directly from the open hearth through a runner or trough 14, as illustrated in this figure.

The mixture of slag and metal received by the centrifuge is subjected to a centrifugal separating action therein, the centrifuge being detachably carried in driving relationship by the upper end of a vertical shaft 15 mounted in suitable bearings and adapted to be driven in any desired manner. During its rotation, the lighter constituents, comprising the slag, pass outwardly through the opening 11 and over the cover 10 into a treatment zone 16, between the centrifuge and the casing 9. Disposed within this zone, but preferably safely above the plane of discharge of the molten slag, is a spray head 17 herein illustrated as comprising a pipe extending completely around the treatment zone and effective for discharging a curtain of water 18 downwardly adjacent the casing. There is also preferably provided a second spray head 19, disposed within the spray head 17 and effective for discharging a plurality of water jets 20 downwardly therefrom.

During the operation of the apparatus, the molten slag passing outwardly from the centrifuge in the direction indicated by the arrows in Figure 1, is met first by the jets 20 and thereafter by the water curtain 18, with the result that the slag in more or less film-like condition as discharged from the centrifuge, is subjected to an abrupt temperature change of such nature as to insure effective granulation thereof. This granulated slag, together with the water, is then discharged by an inclined plate 21 into a slag pit 22. The slag pit is preferably provided with a drain 23 permitting the continuous discharge therefrom of excess water, while permitting the granulated slag to be retained within the pit for future removal and use as required.

By reference to Figure 1, it will be noted that we have shown the cinder pot 5 as provided with a false bottom 24, and with an offtake 25 leading therefrom to the trough or runner 12 at a point slightly above the false bottom. By reason of this construction, there is provided a reservoir in which any excess steel may separate from the slag, in the usual manner, in the cinder pot, from which it may be subsequently reclaimed in the form of a button or disk available for subsequent remelting.

At the conclusion of a given period of slag treatment, and after the centrifuge and its contents have cooled sufficiently to permit handling thereof, the entire centrifuge may be bodily lifted from its confining casing by the use of a crane 26, and the contents discharged from the centrifuge. These contents will comprise principally a band of metal, compacted into a self-sustaining ring under the centrifugal action to which it has been subjected, with a film or partial covering of slag which may be readily separated therefrom. The centrifuge may then be returned to its operative position ready for a succeeding operation.

With a layout in accordance with the present invention, it is possible either to pass the flushing slag directly to the separating and granulating apparatus, without utilizing the cinder pot, or to use the cinder pot in accordance with the usual practice.

While either method is contemplated by the present invention, the procedure followed will usually be determined at least to some extent by the volume of the slag being handled. In actual practice, it has been found that the most desirable results are obtained where the slag is passed by the shortest possible route directly to the centrifuge, the degree of separation obtained therein being greater, the higher the temperature of the ingredients supplied thereto. In any case, our invention obviates the transportation costs incident to usual furnace operation, and provides adjacent the furnace, and therefore adjacent a potential re-melting zone, the metallic constituents to be remelted. The slag formed in granulated condition is likewise collected at a single point available for re-claiming, the disintegration or granulation being such that the slag may be easily handled and charged into a blast furnace or the like, or wasted.

While the present invention contemplates the passage of the slag to the centrifuge by the shortest possible route, and with the fewest number of intermediate handling operations, it will be apparent that some of the advantages of the invention are obtainable in a layout such that the slag must be conveyed from the furnace to the centrifuge in a ladle or pot and subsequently poured into the centrifuge.

In the case of blast furnace slag, the general procedure will be similar to that above outlined, the location of the parts being dependent upon, the furnace construction, the space available, and the slag quantities to be handled.

Figure 3:
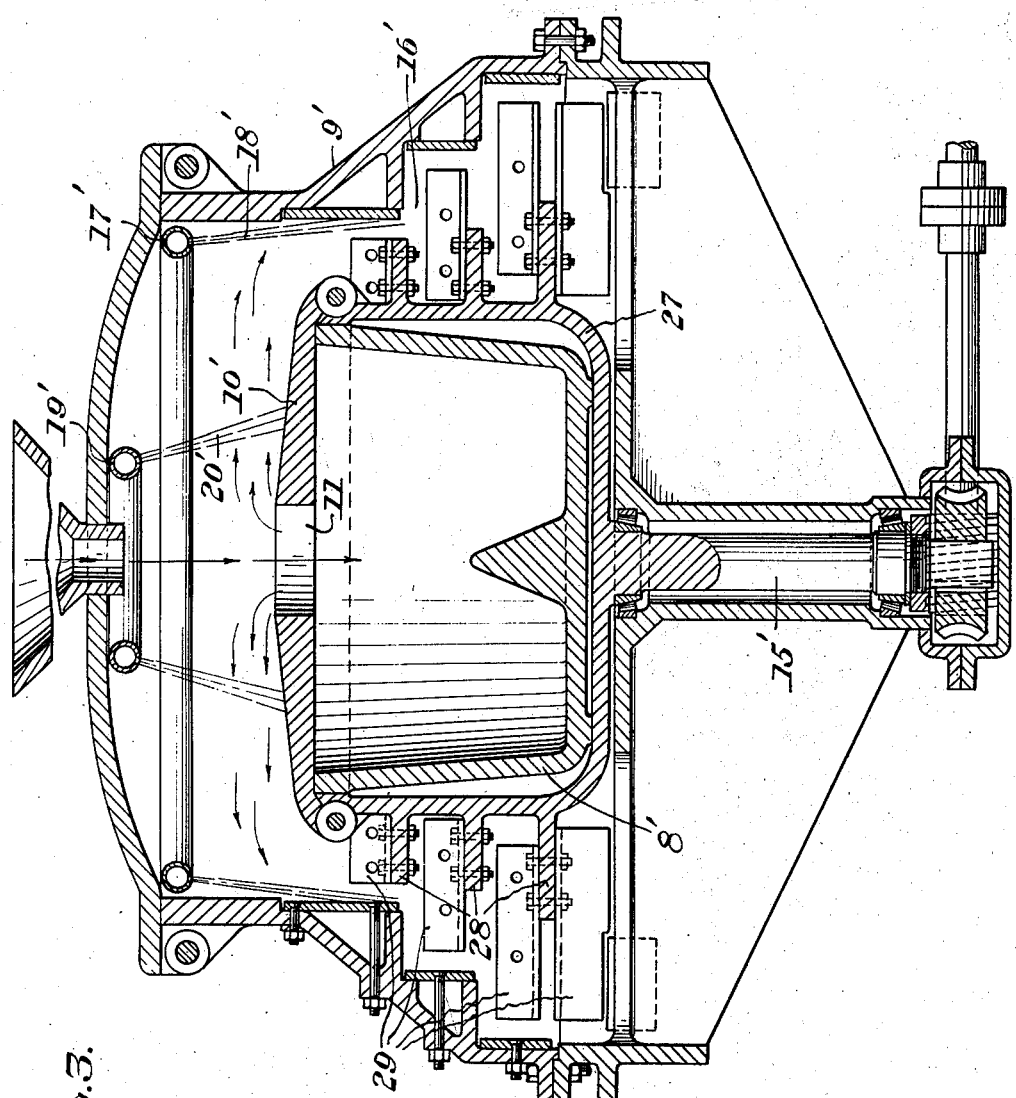
Figure 3 is a view similar to Figure 2, illustrating a modified embodiment of the invention.

While experience has shown that effective slag disintegration may be obtained in a treatment zone of the character described, it may be desirable in some cases to provide an apparatus of the character illustrated in Figure 3, parts in this figure being designated by the same reference characters as those heretofore utilized in connection with Figures 1 and 2, but having a prime affixed thereto.

In Figure 3 the centrifuge 8' is illustrated as a separate pot mounted within a confining rotating chamber 27, which chamber carries the cover 10' and is provided with a series of shelves 28 carrying agitating or beating members 29 projecting in a generally radial direction therefrom and in offset relationship so as to be successively effective on the slag content. Due to the successive treatments thus provided within the treatment zone 16', it is possible to obtain greater uniformity of granulation, which in some cases may justify the added installation expense.

While our invention effects such a percentage of recovery either in the case of iron or steel, as to make the same highly desirable, the percentage of recovery has been found to be particularly high in the case of certain alloys, such for example as ferro-manganese in which the manganese content of the re-claimed metal is particularly desirable and important.

While the invention has been described more particularly in connection with the iron and steel industry, the general principles applicable to this industry are also applicable to the treatment of non-ferrous metals as practiced in smelters and the like, wherein there is at any time a molten mass containing constituents of different specific gravities which it is desirable or advantageous to separate.

The advantages of our invention will be apparent from the foregoing description and the drawings forming part of this application, it being understood that not only does the invention eliminate transportation and handling costs, but that it effects a greater degree of separation together with a better and more complete granulation of the slag constituent.

While we have illustrated and described certain preferred embodiments of the invention, it will be apparent to those skilled in the art that changes in the construction, operation and relationship of the parts may be made without departing either from the spirit of the invention or the scope of our broader claims.

We claim:

1. Apparatus for centrifuging and granulating slag, comprising a centrifuge having a removable cover secured thereto, the top of the centrifuge being flared outwardly and upwardly to permit the removal of cast metal therefrom when the cover is removed, means for discharging slag containing metal into the centrifuge, means for rapidly rotating the centrifuge so as to centrifugally separate the metal from the slag, and water sprays for granulating the slag as discharged from the centrifuge, said centrifuge having agitating members projecting therefrom to act on the slag as it is being granulated.

2. Apparatus for centrifuging and granulating slag comprising a centrifuge and means for driving the centrifuge, a casing surrounding the centrifuge and spaced therefrom, means for spraying water onto the slag as it discharges from the centrifuge and while it is in suspension, and means in the casing for agitating and beating the slag after it has been discharged from the centrifuge and while it remains hot, said means comprising a plurality of beaters projecting laterally beyond the centrifuge toward the casing.

LOUIS C. EDGAR.
EDGAR E. BROSIUS.